(12) United States Patent
Gundlach et al.

(10) Patent No.: US 6,468,337 B1
(45) Date of Patent: Oct. 22, 2002

(54) INK COMPOSITIONS WITH AMINE-FUNCTIONALIZED PIGMENTS

(75) Inventors: Kurt B. Gundlach, Fairport, NY (US); Richard L. Colt, Rochester, NY (US); Maura A. Sweeney, Rochester, NY (US); Luis A. Sanchez, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 180 days.

(21) Appl. No.: 09/620,305

(22) Filed: Jul. 19, 2000

(51) Int. Cl.$^7$ ................................................ C09D 11/02
(52) U.S. Cl. ................... 106/31.28; 106/31.43; 106/31.58; 106/31.75; 106/31.77; 106/31.78; 106/31.86
(58) Field of Search ............... 106/31.28, 31.43, 106/31.58, 31.75, 31.77, 31.78, 31.86

(56) References Cited

U.S. PATENT DOCUMENTS

| | | | |
|---|---|---|---|
| 5,106,416 A | 4/1992 | Moffatt et al. | 106/20 |
| 5,116,409 A | 5/1992 | Moffatt | 106/22 |
| 5,133,803 A | 7/1992 | Moffatt | 106/25 |
| 5,181,045 A | 1/1993 | Shields et al. | 346/1.1 |
| 5,198,023 A | 3/1993 | Stoffel | 106/22 R |
| 5,320,668 A | 6/1994 | Shields et al. | 106/20 R |
| 5,342,440 A | 8/1994 | Wickramanayake | 106/22 R |
| 5,428,383 A | 6/1995 | Shields et al. | 347/96 |
| 5,476,540 A | 12/1995 | Shields et al. | 106/20 R |
| 5,518,534 A | 5/1996 | Pearlstine et al. | 106/20 R |
| 5,531,817 A | 7/1996 | Shields et al. | 106/22 R |
| 5,565,022 A | 10/1996 | Wickramanayake | 106/22 R |
| 5,571,311 A | 11/1996 | Belmont et al. | 106/20 R |
| 5,630,868 A | 5/1997 | Belmont et al. | 106/31.75 |
| 5,672,198 A | 9/1997 | Belmont | 106/20 R |
| 5,698,016 A | 12/1997 | Adams et al. | 106/316 |
| 5,707,432 A | 1/1998 | Adams et al. | 106/31.6 |
| 5,803,959 A | 9/1998 | Johnson et al. | 106/31.75 |
| 5,837,045 A | 11/1998 | Johnson et al. | 106/31.85 |
| 5,851,280 A | 12/1998 | Belmont et al. | 106/472 |
| 5,885,335 A | 3/1999 | Adams et al. | 106/316 |
| 5,895,522 A | 4/1999 | Belmont et al. | 106/31.6 |
| 5,900,029 A | 5/1999 | Belmont et al. | 8/550 |
| 5,922,118 A | 7/1999 | Johnson et al. | 106/31.6 |
| 5,955,232 A | 9/1999 | Little et al. | 430/106 |
| 5,958,121 A * | 9/1999 | Lin | 106/31.43 |
| 6,036,759 A * | 3/2000 | Wickramanayake et al. | 106/31.28 |
| 6,042,643 A | 3/2000 | Belmont et al. | 106/472 |
| 6,234,601 B1 * | 5/2001 | Hayashi et al. | 347/100 |
| 6,280,513 B1 * | 8/2001 | Osumi et al. | 106/31.6 |
| 6,342,095 B1 * | 1/2002 | Takizawa et al. | 106/31.27 |

* cited by examiner

*Primary Examiner*—Helene Klemanski
(74) *Attorney, Agent, or Firm*—Judith L. Byorick

(57) ABSTRACT

Disclosed is a set of inks for printing multicolor images in an ink jet printer, said ink set comprising (1) a first ink having a first color and comprising water and an anionic dye; and (2) a second ink having a second color different from the first color and comprising (a) water, and (b) pigment particles having chemically bonded to the surfaces thereof moieties containing amine or quaternary amine functional groups, wherein the anionic dye in the first ink is capable of being immobilized on a printing substrate by interaction with the pigment particles in the second ink, thereby enabling reduced intercolor bleed.

20 Claims, No Drawings

INK COMPOSITIONS WITH AMINE-FUNCTIONALIZED PIGMENTS

Copending Application U.S. Ser. No. 09/619,746, filed concurrently herewith, entitled "Ink Compositions with Amine-Functionalized Pigments," with the named inventors Garland J. Nichols, Chieh-Min Cheng, and Daniel G. Marsh, the disclosure of which is totally incorporated herein by reference, discloses an ink composition comprising (a) water, (b) pigment particles having chemically bonded to the surfaces thereof moieties containing amine or quaternary amine functional groups, and (c) an amino-functional resin emulsion comprising resin particles and solubilized resin.

BACKGROUND OF THE INVENTION

The present invention is directed to aqueous ink compositions. More specifically, the present invention is directed to ink compositions particularly suitable for use in ink jet printing processes. One embodiment of the present invention is directed to a set of inks for printing multicolor images in an ink jet printer, said ink set comprising (1) a first ink having a first color and comprising water and an anionic dye; and (2) a second ink having a second color different from the first color and comprising (a) water, and (b) pigment particles having chemically bonded to the surfaces thereof moieties containing amine or quaternary amine functional groups, wherein the anionic dye in the first ink is capable of being immobilized on a printing substrate by interaction with the pigment particles in the second ink, thereby enabling reduced intercolor bleed. Another embodiment of the present invention is directed to a multicolor ink jet printing process which comprises: (1) incorporating into an ink jet printer a first ink having a first color and comprising water and an anionic dye; (2) incorporating into the ink jet printer a second ink having a second color different from the first color and comprising (a) water, and (b) pigment particles having chemically bonded to the surfaces thereof moieties containing amine or quaternary amine functional groups; (3) causing droplets of the first ink to be ejected in an imagewise pattern onto a substrate; and (4) causing droplets of the second ink to be ejected in an imagewise pattern onto the substrate, wherein the anionic dye in the first ink is capable of being immobilized on the substrate by interaction with the pigment particles in the second ink, thereby enabling reduced intercolor bleed.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," IBM *Technical Disclosure Bulletin*, Vol. 16, No. 4, September 1973, pp. 1168–1170, the disclosure of which is totally in describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop-on-demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also has been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

U.S. Pat. No. 5,571,311 (Belmont et al.), the disclosure of which is totally incorporated herein by reference, discloses an aqueous ink jet ink composition comprising an aqueous vehicle and a carbon black product having attached at least one organic group. The organic group comprises a) at least one aromatic group and b) at least one ionic group, at least one ionizable group, or a mixture of an ionic group and an ionizable group. The organic group is directly attached to the carbon black by an aromatic group. Also disclosed is an aqueous ink jet ink composition comprising an aqueous vehicle and a carbon black product having attached at least one organic group. The organic group comprises a) at least one $C_1$–$C_{12}$ alkyl group and b) at least one ionic group, at least one ionizable group, or a mixture of an ionic group and an ionizable group. The organic group is directly attached to the carbon black by an alkyl group. Ink jet recording methods applying an ink jet ink of the present invention are also disclosed.

U.S. Pat. No. 5,630,868 (Belmont et al.), the disclosure of which is totally incorporated herein by reference, discloses an aqueous ink jet ink composition comprising an aqueous vehicle and a modified carbon product containing carbon having attached at least one organic group. The organic group comprises a) at least one aromatic group and b) at least one ionic group, at least one ionizable group, or a mixture of an ionic group and an ionizable group. The organic group having an aromatic group is directly attached to the carbon by the aromatic group. The organic group may comprise a) at least one $C_1$–$C_{12}$ alkyl group and b) at least one ionic group, at least one ionizable group, or a mixture of an ionic group and an ionizable group. Ink jet recording methods applying an ink jet ink of the present invention are also disclosed.

U.S. Pat. No. 5,672,198 (Belmont), the disclosure of which is totally incorporated herein by reference, discloses aqueous ink compositions which include a modified carbon product comprising a carbon having attached at least one organic group that is substituted with an ionic or an ionizable group. A coating composition is also disclosed and comprises water, a binder, and a modified carbon product having at least one organic group attached to carbon wherein the organic group is substituted with an ionic or an ionizable group.

U.S. Pat. No. 5,837,045 (Johnson et al.), the disclosure of which is totally incorporated herein by reference, discloses a surface-modified colored pigment which includes a colored pigment having no primary amines and at least one attached hydrophilic organic group, wherein said organic group comprises a) at least one aromatic group, and b) at least one ionic group or ionizable group, or a mixture of an ionic group or an ionizable group. The colored pigment may be blue, brown, cyan, green, violet, magenta, red, orange, yellow, mixtures thereof, and the like. The surface-modified colored pigment, due to the hydrophilic groups on its surface, is readily dispersed in a liquid vehicle without the addition of a surfactant or other dispersing aid or additive. The surface-modified color pigment may be used in a variety of aqueous systems including, but not limited to, coatings, paints, papers, adhesives, latexes, inks, toners, textiles and fibers. In addition, an aqueous composition is disclosed including water-based liquid vehicle and the surface-modified colored pigment. Also disclosed is an ink composition including a water-based liquid vehicle and the surface-modified colored pigment. Finally, a process is disclosed for preparing the surface-modified colored pigments having no primary amines and at least one attached hydrophilic organic group, wherein said organic group comprises a) at least one aromatic group, and b) at least one ionic or ionizable group, or a mixture of an ionic group or an ionizable group.

U.S. Pat. No. 5,707,432 (Adams et al.), the disclosure of which is totally incorporated herein by reference, discloses a modified carbon product which comprises carbon having attached at least one organic group. The organic group comprises a) at least one aromatic group or a $C_1$–$C_{12}$ alkyl group and b) at least one ionic group, at least one ionizable group, or a mixture of an ionic group and an ionizable group. The aromatic group or the $C_1$–$C_{12}$ alkyl group of the organic group is directly attached to the carbon and the organic group is present at a level of from about 0.10 to about 2.5 micromoles/m$^2$ of the carbon used based on CTAB or t-area of the carbon or in an amount such that the modified carbon product has a residue value of more than about 5 weight percent. Also disclosed are aqueous and non-aqueous inks and coatings containing the modified carbon product. A method to increase the flow of an ink, as measured by glass plate flow, by incorporating the modified carbon product as part of the ink is also disclosed. Lastly, non-aqueous ink and coating formulations are disclosed which contain an appropriate solvent and a modified carbon product comprising carbon having attached at least one organic group, wherein the organic group comprises a) at least one aromatic group or $C_1$–$C_{12}$ alkyl group, and b) at least one ionic group, at least one ionizable group, or a mixture of an ionic group and an ionizable group, wherein the organic group is present in any amount.

U.S. Pat. No. 5,803,959 (Johnson et al.), the disclosure of which is totally incorporated herein by reference, discloses a modified carbon product which comprises carbon having attached at least one organic group. The organic group comprises a) at least one aromatic group or a $C_1$–$C_{12}$ alkyl group and b) at least one ionic group, at least one ionizable group, or a mixture of an ionic group and an ionizable group. The aromatic group or the $C_1$–$C_{12}$ alkyl group of the organic group is directly attached to the carbon and the organic group is present at a level of from about 0.10 to about 4.0 micromoles/m$^2$ of the carbon used based on nitrogen surface area of the carbon. Also disclosed are aqueous and non-aqueous inks and coatings and ink jet ink compositions containing the modified carbon product. A method to increase the flow of an ink, as measured by glass plate flow, by incorporating the modified carbon product as part of the ink is also disclosed as well as a method to improve the waterfastness of a print imaged by an ink composition. Lastly, non-aqueous ink and coating formulations are disclosed which contain an appropriate solvent and a modified carbon product comprising carbon having attached at least one organic group, wherein the organic group comprises a) at least one aromatic group or $C_1$–$C_{12}$ alkyl group, and b) at least one ionic group, at least one ionizable group, or a mixture of an ionic group and an ionizable group, wherein the organic group is present in any amount.

U.S. Pat. No. 5,885,335 (Adams et al.), the disclosure of which is totally incorporated herein by reference, discloses a modified carbon product which comprises carbon having attached at least one organic group. The organic group comprises a) at least one aromatic group or a $C_1$–$C_{12}$ alkyl group and b) at least one ionic group, at least one ionizable group, or a mixture of an ionic group and an ionizable group. The aromatic group or the $C_1$–$C_{12}$ alkyl group of the organic group is directly attached to the carbon and the organic group is present at a level of from about 0.10 to about 2.7 micromoles/m$^2$ of the carbon used based on CTAB or t-area of the carbon or in an amount such that the modified carbon product has a residue value of more than about 5 weight percent. Also disclosed are aqueous and non-aqueous inks and coatings containing the modified carbon product. A method to increase the flow of an ink, as measured by glass plate flow, by incorporating the modified carbon product as part of the ink is also disclosed. Lastly, non-aqueous ink and coating formulations are disclosed which contain an appropriate solvent and a modified carbon product comprising carbon having attached at least one organic group, wherein the organic group comprises a) at least one aromatic group or $C_1$–$C_{12}$ alkyl group, and b) at least one ionic group, at least one ionizable group, or a mixture of an ionic group and an ionizable group, wherein the organic group is present in any amount.

U.S. Pat. No. 5,895,522 (Belmont et al.), the disclosure of which is totally incorporated herein by reference, discloses a modified carbon product which comprises carbon having attached at least one organic group wherein the organic group comprises a) at least one aromatic group or a $C_1$–$C_{12}$ alkyl group, and b) a group having the formula -AG-Sp-LG-Z, wherein AG is an activating group, Sp is a spacer group, LG is a leaving group, and Z is a counterion, and wherein the aromatic or the $C_1$–$C_{12}$ alkyl group is directly attached to the carbon, and wherein the organic group is present in any amount. Also disclosed are ink and coating compositions comprising these modified carbon products.

U.S. Pat. No. 5,922,118 (Johnson et al.), the disclosure of which is totally incorporated herein by reference, discloses a modified colored pigment which comprises colored pigment having attached at least one organic group. The organic group comprises a) at least one aromatic group or a $C_1$–$C_{12}$ alkyl group and b) at least one ionic group, at least one ionizable group, or a mixture of an ionic group and an ionizable group. The aromatic group or the $C_1$–$C_{12}$ alkyl group of the organic group is directly attached to the pigment and the organic group is present at a treatment level of from about 0.10 to about 4.0 micromoles/m$^2$ of the pigment used based on nitrogen surface area of the pigment. Also disclosed are aqueous and non-aqueous inks and coatings and ink jet ink compositions containing the modified colored pigment. A method to increase the flow of an ink is also disclosed as well as a method to improve the waterfastness of a print imaged by an ink composition. Also, other ink jet ink compositions are disclosed which comprise an aqueous or non-aqueous vehicle and a colored pigment having attached an organic group having the formula: Ar-$R^1$ (I) or Ar'$R^3R^2$ (II) wherein Ar is an aromatic group and Ar' is an aromatic group.

U.S. Pat. No. 5,698,016 (Adams et al.), the disclosure of which is totally incorporated herein by reference, discloses a composition which comprises a) an amphiphilic ion, and b) a modified carbon product comprising carbon having attached at least one organic group. The organic group has a charge opposite to the amphiphilic ion. Also disclosed are aqueous and non-aqueous ink and coating compositions incorporating this composition. Ink jet ink compositions are further disclosed incorporating this composition.

U.S. Pat. No. 5,851,280 (Belmont et al.), the disclosure of which is totally incorporated herein by reference, discloses processes for preparing a carbon black product having an organic group attached to the carbon black. In one process at least one diazonium salt reacts with a carbon black in the absence of an externally applied electric current sufficient to reduce the diazonium salt. In another process at least one diazonium salt reacts with a carbon black in a protic reaction medium. Carbon black products which may be prepared according to the process are disclosed, as well as uses of such carbon black products in plastic compositions, rubber compositions, paper compositions, and textile compositions.

U.S. Pat. No. 5,955,232 (Little et al.), the disclosure of which is totally incorporated herein by reference, discloses a toner composition which contains modified pigment particles having attached organic groups and styrenic polymer-based resin particles. The organic groups which are attached to the pigment particles are positively chargeable. Developer compositions containing the toner compositions and methods of imaging are also disclosed which use the toner compositions.

U.S. Pat. No. 5,900,029 (Belmont et al.), the disclosure of which is totally incorporated herein by reference, discloses processes for coloring a fiber or textile by adding a carbon black product having an organic group attached to the carbon black. In one process at least one diazonium salt reacts with a carbon black in the absence of an externally applied electric current sufficient to reduce the diazonium salt. In another process at least one diazonium salt reacts with a carbon black in a protic reaction medium. Carbon black products which may be prepared according to the process are disclosed, as well as uses of such carbon black products in plastic compositions, rubber compositions, paper compositions, and textile compositions.

U.S. Pat. No. 6,042,643 (Belmont et al.), the disclosure of which is totally incorporated herein by reference, discloses processes for preparing a carbon black product having an organic group attached to the carbon black. In one process at least one diazonium salt reacts with a carbon black in the absence of an externally applied electric current sufficient to reduce the diazonium salt. In another process at least one diazonium salt reacts with a carbon black in a protic reaction medium. Carbon black products which may be prepared according to the process are disclosed, as well as uses of such carbon black products in plastic compositions, rubber compositions, paper compositions, and textile compositions.

U.S. Pat. No. 5,116,409 (Moffatt), the disclosure of which is totally incorporated herein by reference, discloses the alleviation of color bleed (the invasion of one color into another on the surface of the print medium) using ink jet inks by employing zwitterionic surfactants (pH-sensitive or pH-insensitive) or ionic or nonionic amphiphiles. The inks comprise a vehicle and a dye. The vehicle typically comprises a low viscosity, high boiling point solvent, one or two amphiphiles at concentrations above their critical micelle concentration (cmc), while the dye typically comprises any of the dyes commonly employed in ink jet printing. The amount of surfactant/amphiphile is described in terms of its critical micelle concentration (cmc), which is a unique value for each amphiphile. Above the cmc, micelles form, which attract the dye molecule and thus control the color bleed. Below the cmc, there is no micelle formation, and thus no control of the color bleed.

U.S. Pat. No. 5,106,416 (Moffatt et al.), the disclosure of which is totally incorporated herein by reference, discloses the alleviation of color bleed (the invasion of one color into another on the surface of the print medium) using ink jet inks by employing zwitterionic surfactants (pH-sensitive or pH-insensitive) or ionic or non ionic amphiphiles. The inks of the invention comprise a vehicle and a cationic dye. The vehicle typically comprises a low viscosity, high boiling point solvent, one or two amphiphiles at concentrations above their critical micelle concentration (cmc), while the dye typically comprises any of the dyes commonly employed in ink jet printing. The amount of surfactant/amphiphile is described in terms of its critical micelle concentration (cmc), which is a unique value for each amphiphile. Above the cmc, micelles form, which attract the dye molecule and thus control the color bleed. Below the cmc, there is no micelle formation, and thus no control of the color bleed.

U.S. Pat. No. 5,133,803 (Moffatt), the disclosure of which is totally incorporated herein by reference, discloses the control of color bleed (the invasion of one color into another on the surface of the print medium) using ink jet inks by employing high molecular weight colloids, such as alginates, in conjunction with amphoteric surfactants and/or nonionic amphiphiles. The inks disclosed comprise a vehicle and a dye. The vehicle typically comprises a low viscosity, high boiling point solvent and one or two surfactants at concentrations above their critical micelle concentration (cmc), while the dye typically comprises any of the dyes commonly employed in ink jet printing. The amount of surfactant is described in terms of its critical micelle concentration (cmc), which is a unique value for each surfactant system. Above the cmc, colloidal species form, which attract the dye molecules and thus control the color bleed. Below the cmc, there is no colloid, and thus poor control of the color bleed results. Also, the presence of the high molecular weight colloid further improves the text print quality and renders sharper definition among colors printed adjacent one another.

U.S. Pat. No. 5,181,045 (Shields et al.), the disclosure of which is totally incorporated herein by reference, discloses certain dyes which become insoluble under specific and well defined pH conditions. By forcing a dye to become insoluble on the page, migration of the dye is inhibited, thereby helping to reduce bleed between inks of different colors. The dye is forced out of solution from the ink by contact with another ink having the appropriate pH (either higher or lower than that of the first ink).

U.S. Pat. No. 5,320,668 (Shields et al.), the disclosure of which is totally incorporated herein by reference, discloses certain colorants which become insoluble under specific and well defined pH conditions. By forcing a colorant to become insoluble on the page, migration of the colorant is inhibited, thereby helping to reduce bleed between inks of different colors. The colorant is forced out of solution from the ink by contact with another ink having the appropriate pH (either higher or lower than that of the first ink). In particular, an ink containing a colorant comprising a pigment in combination with a pH sensitive dispersant is used in conjunction with an ink of the appropriate pH.

U.S. Pat. No. 5,342,440 (Wickramanayake), the disclosure of which is totally incorporated herein by reference, discloses water insoluble black dyes which are formulated in a microemulsion based ink. When printed adjacent to color inks (yellow, magenta, cyan) containing water soluble dyes, bleed does not occur between the black and the color dyes.

U.S. Pat. No. 5,476,540 (Shields et al.), the disclosure of which is totally incorporated herein by reference, discloses a method for controlling color bleed between adjacent multicolor ink regions on a print medium. Color bleed involves the migration of color agents between adjacent zones in a multicolored printed image on a print medium. A first composition containing a gel forming species and a color agent is brought into contact on a region of the print medium with a second composition having a color agent and a gel initiating species or chemical conditions which bring about gelation. In alternative embodiments, the print medium can be pretreated with either a gel initiating species or a gel forming species (with no colorant), followed by treatment with a gel forming species or gel initiating species (with colorant), respectively. The formation of the gel upon the print medium impedes the movement of the color agent or agents and thus reduces the color bleed between adjacent zones.

U.S. Pat. No. 5,531,817 (Shields et al.), the disclosure of which is totally incorporated herein by reference, discloses the control of color bleed (the invasion of one color into another on the surface of the print medium) using ink jet inks by employing either high molecular weight polymers that exhibit a reversible gelling nature with heat or certain amine oxide surfactants that undergo sol-gel transitions. The inks further include a vehicle and a dye. The vehicle typically comprises a low viscosity, high boiling point solvent and water. Certain high molecular weight polymers, under the correct solution conditions, can form gels which can be subsequently melted by heating of the gel. When the melted gel is cooled, it will then reform into a gel. The viscosity of an ink employing such a gel can be reduced to a viscosity low enough to permit jetting from the print cartridge. After leaving the print cartridge, the melted gel will again reform into a highly viscous gel to immobilize the droplet of ink and prevent its migration on the media. Therefore, two drops of different colors, when printed next to one another will thus be inhibited from migrating or bleeding into one another.

U.S. Pat. No. 5,565,022 (Wickramanayake), the disclosure of which is totally incorporated herein by reference, discloses ink jet ink compositions which exhibit fast dry times and bleed free prints when printed onto a print medium so that the throughput of an ink jet printer can be increased. The ink compositions comprise (a) at least one dye; (b) at least one high boiling, water insoluble organic compound; (c) at least one amphiphile; and (d) water. The dye can be either water soluble or water insoluble and the high boiling organic compound has a vapor pressure low enough such that only water evaporates from the ink during normal printing operations. The amphiphile is present in an amount sufficient to solubilize the water insoluble organic compound in the water. Preferably, the amphiphile belongs to a class of compounds known as hydrotropes.

U.S. Pat. No. 5,198,023 (Stoffel), the disclosure of which is totally incorporated herein by reference, discloses an ink set in which bleed between yellow and black inks is reduced by using a cationic yellow dye in the yellow ink and an anionic dye in the black ink. Bleed is further reduced by adding a multivalent precipitating agent to the yellow ink. With regard to bleed between yellow and other color inks (cyan and magenta), bleed is reduced by also employing anionic dyes in the color inks.

U.S. Pat. No. 5,428,383 (Shields et al.) and U.S. Pat. No. 5,488,402 (Shields et al.), the disclosures of each of which are totally incorporated herein by reference, disclose a method for controlling color bleed in multicolor thermal inkjet printing systems. Color bleed involves the migration of coloring agents between adjacent zones in a multicolor printed image on a substrate. To control color bleed between any two ink compositions in a multi-ink system, at least one of the ink compositions will contain a precipitating agent (such as a multivalent metal salt). The precipitating agent is designed to react with the coloring agent in the other ink composition of concern. As a result, when the two ink compositions come in contact, a precipitate is formed from the coloring agent in the other ink composition which prevents migration thereof and color bleed problems. This technique is applicable to printing systems containing two or more ink compositions, and enables distinct multicolor images to be produced without the problems normally caused by color bleed.

U.S. Pat. No. 5,518,534 (Pearlstine et al.), the disclosure of which is totally incorporated herein by reference, discloses an ink set for alleviating bleed in multicolor printed elements employing a first ink and a second ink, each containing an aqueous carrier medium and a colorant; the colorant in the first ink being a pigment dispersion and the second ink containing a salt of an organic acid or mineral acid having a solubility of at least 10 parts in 100 parts of water at 25° C.

While known compositions and processes are suitable for their intended purposes, a need remains for improved aqueous inks. In addition, a need remains for improved ink compositions for thermal ink jet printing. Further, a need remains for ink compositions that enable enhanced dry smear resistance when printed onto substrates. Additionally, a need remains for ink compositions that enable enhanced wet smear resistance when printed onto substrates. There is also a need for ink compositions that generate prints of high optical density. In addition, there is a need for ink compositions that exhibit good latency in ink jet printers. Further, there is a need for ink compositions that generate lightfast prints on substrates. Additionally, there is a need for ink compositions that generate waterfast prints on substrates. A need also remains for ink compositions that generate images with low edge raggedness and MFLEN values. In addition, a need remains for ink compositions that exhibit good frequency response in ink jet printers. Further, a need remains for ink compositions that generate prints on substrates such as paper wherein the imaged substrate exhibits reduced curling. Additionally, a need remains for ink compositions that generate prints on substrates such as paper wherein showthrough of the image on the surface of the substrate opposite to that imaged is reduced. There is also a need for ink compositions that exhibit improved ink-to-paper adhesion. In addition, there is a need for ink sets for ink jet printing that enable the generation of multicolored images with reduced intercolor bleed.

SUMMARY OF THE INVENTION

The present invention is directed to a set of inks for printing multicolor images in an ink jet printer, said ink set comprising (1) a first ink having a first color and comprising water and an anionic dye; and (2) a second ink having a second color different from the first color and comprising (a) water, and (b) pigment particles having chemically bonded to the surfaces thereof moieties containing amine or quaternary amine functional groups, wherein the anionic dye in the first ink is capable of being immobilized on a printing substrate by interaction with the pigment particles in the second ink, thereby enabling reduced intercolor bleed. Another embodiment of the present invention is directed to a multicolor ink jet printing process which comprises: (1) incorporating into an ink jet printer a first ink having a first color and comprising water and an anionic dye; (2) incorporating into the ink jet printer a second ink having a second color different from the first color and comprising (a) water, and (b) pigment particles having chemically bonded to the surfaces thereof moieties containing amine or quaternary amine functional groups; (3) causing droplets of the first ink to be ejected in an imagewise pattern onto a substrate; and (4) causing droplets of the second ink to be ejected in an imagewise pattern onto the substrate, wherein the anionic dye in the first ink is capable of being immobilized on the substrate by interaction with the pigment particles in the second ink, thereby enabling reduced intercolor bleed.

DETAILED DESCRIPTION OF THE INVENTION

The first and second inks of the present invention contain an aqueous liquid vehicle. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether (such as DOWANOL® TPM), ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant or cosolvent which has a boiling point higher than that of water (100° C.). In the ink compositions of the present invention, the liquid vehicle is typically present in an amount of from about 80 to about 99.9 percent by weight of the ink, and preferably from about 90 to about 99 percent by weight of the ink, although the amount can be outside these ranges.

The first and second inks of the present invention also contain colorants. The first ink of the present invention contains an anionic dye colorant. Any desired or suitable anionic dye can be employed in the first ink for the present invention. Examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza(18)annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Savinyl Blue GLS (Sandoz); Luxol Blue MBSN (Morton-Thiokol); Basacid Blue 750 (BASF); Bernacid Red, available from Berncolors, Poughkeepsie, N.Y.; Pontamine Brilliant Bond Blue; Berncolor A.Y. 34; Telon Fast Yellow 4GL-1 75; BASF Basacid Black SE 0228; the Pro-Jet)® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Hoechst, such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), various Reactive dyes, including Reactive Black dyes, Reactive Blue dyes, Reactive Red dyes, Reactive Yellow dyes, and the like, as well as mixtures thereof. The anionic dye is present in the first ink composition in any desired or effective amount, typically from about 0.05 to about 10 percent by weight of the ink, preferably from about 0.1 to about 7 percent by weight of the ink, and more preferably from about 1 to about 5 percent by weight of the ink, although the amount can be outside of these ranges.

The second ink of the present invention contains pigment particles as a colorant. Any desired or suitable pigment can be employed in the second ink. Examples of suitable pigments include various forms of carbon, including carbon blacks such as channel black, furnace black, lamp black, and the like. Colored pigments include red, green, blue, brown, magenta, cyan, yellow, and other colored particles, as well as mixtures thereof. Illustrative examples of magenta pigments include 2,9-dimethyl-substituted quinacridone and anthraquinone dye, identified in the Color Index as CI 60710, CI Dispersed Red 15, a diazo dye identified in the Color Index as CI 26050, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Raven® 5250, Raven® 5750, Raven® 3500 and other similar carbon black products available from Columbia Company, Regal® 330, Black Pearl® L, Black Pearl® 1300, and other similar carbon black products available from Cabot Corporation, sulfonated and carboxylated pigments available from Cabot Corporation, Degussa carbon blacks such as Color Black® series, Special Black® series, Printtex® series and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine® Black TS (Pigment Black 7), available from Clariant Corp., Charlotte, N.C., Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (Clariant Corp., Charlotte, N.C.), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange 6 (Aldrich), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991 K (BASF), Paliotol Yellow 1840 (BASF), Novoperm Yellow F6 1 (Clariant Corp., Charlotte, N.C.), Novoperm Yellow FG1 (Clariant Corp., Charlotte, N.C.), Permanent Yellow YE 0305 (Paul Uhlich), Lumogen Yellow D0790 (BASF), Suco-Gelb L1250 (BASF), Suco-Yellow D1355 (BASF), Hostaperm Pink E (Clariant Corp., Charlotte, N.C.), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company)), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), CAB-O-JET 200 hydrophilic carbon black (Cabot Corp.), CAB-O-JET 300 hydrophilic carbon black (Cabot Corp.), and the like. Additional suitable commercially available pigment dispersions include the Hostafines available from Clariant Corp., Charlotte, N.C., including Hostafine Yellow HR and Hostafine Blue B2G, dispersions available from BASF, including Disperse Black 00-6607, Luconyl Yellow 1250, Basoflex Pink 4810, Luconyl Blue 7050, and the like, dispersions available from Keystone Aniline Corp., such as Keystone Jet Print Micro Black (Pigment Black 7), Keystone Jet Print Micro Blue (Pigment Blue 15:3), Keystone Jet Print Micro Magenta (Pigment Red 122), Keystone Jet Print Micro Yellow (Pigment Yellow 13), and the like, dispersions available from Bayer AG, such as Bayscript Yellow P PZD 101440 (Pigment Yellow 74), Bayscript Magenta P PAD 101090 (Pigment Red 122), and the like. Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.05 to about 1 micron, although the particle size can be outside these ranges. Within the second ink of the present invention, the pigment is present in any effective amount to achieve the desired degree of coloration. Typically, the pigment is present in an amount of from about 0.1 to about 8 percent by weight of the ink, and preferably from about 2 to about 7 percent by weight of the ink, although the amount can be outside these ranges.

The pigment particles have chemically bonded to the surfaces thereof moieties containing amine or quaternary amine functional groups. The amine or quaternary amine functional groups can either be bonded directly to the pigment particles or be contained within other moieties bonded to the pigment particles, such as amine-or quaternary amine-substituted alkyl, aryl, arylalkyl, or alkylaryl groups (including saturated, unsaturated, linear, branched, cyclic, heterocyclic (with suitable hetero atoms including but not being limited to nitrogen, oxygen, sulfur, and phosphorus), and substituted hydrocarbons, typically with from 1 to about 18 carbon atoms, although the number of carbon atoms can be outside of this range). Examples of suitable amine and quaternary amine functional groups include those of the general formulae

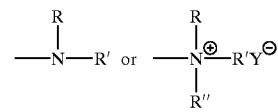

and examples of suitable moieties containing amine and quaternary amine functional groups include those of the general formulae

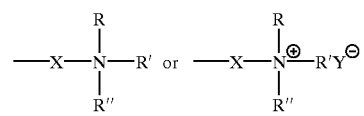

wherein R, R', and R" are each, independently of the others, hydrogen atoms, alkyl groups (including saturated, unsaturated, linear, branched, cyclic, and substituted alkyl groups), typically with from 1 to about 10 carbon atoms, and preferably with from 1 to about 6 carbon atoms, although the number of carbon atoms can be outside of these ranges, aryl groups (including substituted aryl groups), typically with from 6 to about 15 carbon atoms, and preferably with from 6 to about 10 carbon atoms, although the number of carbon atoms can be outside of these ranges, arylalkyl and alkylaryl groups (including substituted arylalkyl and alkylaryl groups), typically with from 7 to about 14 carbon atoms, and preferably with from 7 to about 10 carbon atoms, although the number of carbon atoms can be outside of these ranges, X is an alkylene group (including saturated, unsaturated, linear, branched, cyclic, and substituted alkylene groups), typically with from 1 to about 10 carbon atoms, and preferably with from 1 to about 5 carbon atoms, although the number of carbon atoms can be outside of these ranges, arylene groups (including substituted arylene groups), typically with from 6 to about 18 carbon atoms, and preferably with from 6 to about 12 carbon atoms, although the number of carbon atoms can be outside of these ranges, arylalkylene and alkylarylene groups (including substituted arylalkylene and alkylarylene groups), typically with from 7 to about 24 carbon atoms, and preferably with from 7 to about 14 carbon atoms, although the number of carbon atoms can be outside of these ranges, wherein the substituents on the substituted alkyl, aryl, arylalkyl, alkylaryl, alkylene, arylene, arylalkylene, and alkylarylene groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, mixtures thereof, and the like, wherein two or more substituents can be joined together to form a ring, and Y is an anion (wherein the anion can have any desired charge, such as −1, −2, −3, or the like, and can also include a polyanionic material such as a polymer with multiple anionic sites), including (but not limited to) Cl−, Br−, I−, $HSO_4^-$, $HSO_3^-$, $SO_4^{2-}$, $SO_3^{2-}$, $CH_2SO_3^-$, $CH_3SO_3^-$, $CH_3C_6H_4SO_3^-$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, SCN−, $BF_4^-$, $ClO_4^-$, $SSO_3^-$, or the like, as well as mixtures thereof. Specific examples of suitable amine and quaternary amine groups include (but are not limited to) pyridine, pyridinium salts, N-ethyl pyridinium salts, N-methyl pyridinium salts, choline salts, groups of the formula

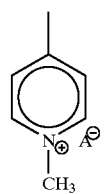

wherein A is an anion, those of the formula

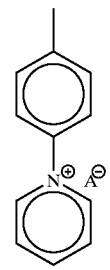

wherein A is an anion, those of the formula

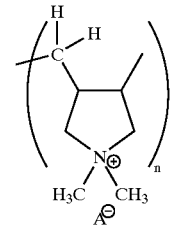

wherein n is an integer representing the number of repeat monomer units, and the like, as well as mixtures thereof. The amine or quaternary amine group can be attached directly to one of the carbon atoms on the -X- group, or it can be attached to a substituent atom or group thereon.

Amine or quaternary amine groups can be bonded to the pigment particle surfaces by any desired method, such as those disclosed in, for example, U.S. Pat. No. 5,571,311, U.S. Pat. No. 5,630,868, U.S. Pat. No. 5,672,198, U.S. Pat. No. 5,837,045, U.S. Pat. No. 5,707,432, U.S. Pat. No. 5,803,959, U.S. Pat. No. 5,885,335, U.S. Pat. No. 5,895,522, U.S. Pat. No. 5,922,118, U.S. Pat. No. 5,698,016, U.S. Pat. No. 5,851,280, U.S. Pat. No. 5,955,232, U.S. Pat. No. 5,900,029, and U.S. Pat. No. 6,042,643, the disclosures of each of which are totally incorporated herein by reference. Amine or quaternary amine groups can also be bonded to the pigment particle surfaces by obtaining a commercially available pigment having chemically bonded to the particle surfaces thereof suitable reactive functional groups, such as carboxylic acid groups sulfonic acid groups, carboxylate groups, sulfonate groups, or the like, such as CABOJET® 300 and CABOJET® 200, available from Cabot Corp., Boston, Mass., treating the acidic pigment particles with a quaternary ammonium salt, such as pyridinium salts such as pyridinium chloride, choline salts such as choline chloride, polydiallyldimethylammonium salts such as polydiallyldimethylammonium chloride, or the like, condensing the resulting product to an amide by extracting water, and reacting the amide with a reducing agent to form amine or quaternary amine functional groups chemically bonded to the pigment particle surfaces. Some specific examples of suitable reactive functional groups on pigment particles include (but are not limited to) the following:

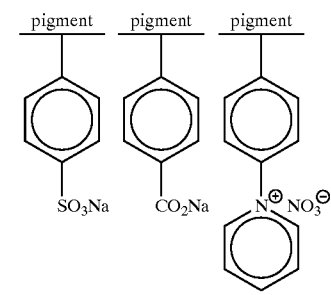

Another specific example of a suitable reaction is as follows:

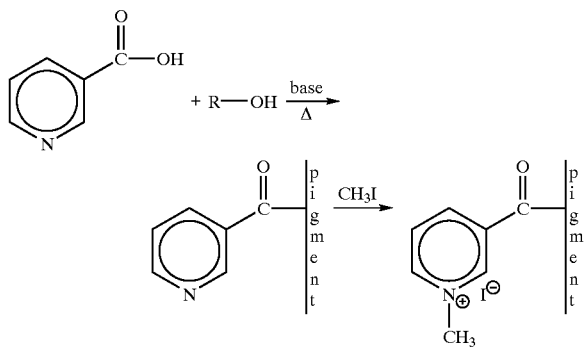

Optionally, the pigment particles in the second ink are present in combination with a resin emulsion, wherein the resin emulsion acts as a binding agent for the pigment particles. The resin emulsion typically comprises resin particles and solubilized resin derived from the polymerization in water of an olefinic acid, such as acrylic acid or methacrylic acid, and an olefinic acrylate or methacrylate, such as methyl acrylate, methyl methacrylate, ethyl acrylate, ethyl methacrylate, propyl acrylate, propyl methacrylate, butyl acrylate, butyl methacrylate, pentyl acrylate, pentyl methacrylate, hexyl acrylate, hexyl methacrylate, heptyl acrylate, heptyl methacrylate, octyl acrylate, octyl methacrylate, nonyl acrylate, nonyl methacrylate, decyl acrylate, decyl methacrylate, lauryl acrylate, lauryl methacrylate, stearyl acrylate, stearyl methacrylate, dodecyl acrylate, dodecyl methacrylate, benzyl acrylate, benzyl methacrylate, polyethyleneglycol acrylate, polyethyleneglycol methacrylate, polyoxyalkylene acrylate, polyoxyalkylene methacrylate, or the like. Typical polyoxyalkylene acrylates and methacrylates include those of the general formula

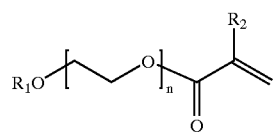

wherein R is a hydrogen atom or an alkyl group, typically with from 1 to about 6 carbon atoms, and n is a number representing the number of repeat monomer units, typically being from 2 to about 100.

The resin has amino functional groups thereon. One way of preparing such a resin is to include one or more amino-functional monomers in the polymerization process. Examples of suitable amino-functional monomers include dimethylaminoethyl acrylate, dimethylaminoethyl methacrylate, diethylaminoethyl acrylate, diethylaminoethyl methacrylate, 2-diisopropylaminoethyl acrylate, 2-diisopropylaminoethyl methacrylate, 2-aminoethyl acrylate hydrochloride, 2-aminoethyl methacrylate hydrochloride, N-(3-aminopropyl) acrylamide hydrochloride, N-(3-aminopropyl) methacrylamide hydrochloride, 2-(tert-butylamino)ethyl acrylate, 2-(tert-butylamino)ethyl methacrylate, N-t-butyl acrylamide, N-t-butyl methacrylamide, N,N-dimethylacrylamide, N,N-dimethylmethacrylamide, N-vinyl caprolactam, N-vinyl pyrrolidone, diallyidimethylammonium chloride, 2-acryloxyethyltrimethylammonium chloride, 2-methacryloxyethyltrimethylammonium chloride, 3-acryloxy-2-hydroxypropyltrimethylammonium chloride, 3-methacryloxy-2-hydroxypropyltrimethylammonium chloride, and the like, as well as mixtures thereof, with preferred amino-functional monomers being dimethylaminoethyl acrylate, dimethylaminoethyl methacrylate, diethylaminoethyl acrylate, diethylaminoethyl methacrylate, 2-diisopropylaminoethyl acrylate, 2-diisopropylaminoethyl methacrylate, N-vinyl pyrrolidone, and 2-methacryloxyethyltrimethylammonium chloride.

The amino-functional resin latex emulsion as analyzed by GPC typically has a number average molecular weight of from about 5,000 to about 500,000 grams per mole and a weight average molecular weight of from about 10,000 to about 1,000,000, although the molecular weight values can be outside of these ranges, with typical polydispersity values of from about 2 to about 5, although the polydispersity can be outside of this range. The latex particles typically have an average particle diameter as measured by Coulter counter nanosize particle analyzer of from about 100 to about 500 nanometers, although the average particle diameter can be outside of this range. The resin glass transition temperature as measured by DSC typically is from about 25 to about 120° C., although the glass transition temperature can be outside of this range. The resin emulsion typically comprises from about 60 to about 99 percent by weight resin particles and from about 1 to about 40 percent by weight solubilized resin, and preferably comprises from about 90 to about 97 percent by weight resin particles and from about 3 to about 10 percent by weight solubilized resin, although the relative amounts can be outside of these ranges. Both the resin particles and the solubilized resin can be generated from a free radical type process in water, wherein one of the monomers is water soluble, such as an acrylic acid or a methacrylic acid, and the other monomer(s) exhibit low solubility in water (for example, from about 0.05 to about 2 percent by weight soluble in water), such as an alkyl acrylate or an alkyl methacrylate or a polyoxyalkylene(meth) acrylate.

The free radical initiator is generally an emulsion type initiator, such as a persulfate, like potassium or ammonium persulfate. Chain transfer agents can be used to adjust the molecular weight of the resin and to adjust the resin particle to solubilized resin ratio. Suitable chain transfer agents include alkylthiols, such as dodecanethiol, halogenated hydrocarbons, such as carbon tetrabromide, or, preferably, a combination of an alkylthiol and a halogenated hydrocarbon. Surfactants can also be incorporated into the resin emulsion, including anionic, cationic, and nonionic surfactants. Examples of suitable surfactants include sodium dodecylbenzene sulfonate, polyethylene oxide, polyethylene oxide nonyl phenyl ether, tetraalkyl ammonium chloride, sodium naphthalene sulfonate, and the like, typically present in an amount of from about 0.005 to about 20 weight percent of the resin, and preferably from about 0.1 to about 5 percent by weight of the resin, although the amount can be outside of these ranges. Generally, the olefinic acidic monomer comprises from about 5 to about 20 parts by weight of the resins, the olefinic alkyl(meth)acrylate comprises from about 40 to about 60 parts by weight of the resins, and the polyethyleneglycol methacrylate, or, more generally, a low molecular weight polyethylene glycol capped with a methacrylate or acrylate, comprises from about 0 to about 20 parts by weight of the resins. Although both the resin particles and the solubilized resin are derived from the same monomers, the monomer content may be different in the resin particles as compared to the solubilized resin; more specifically, the solubilized resin may contain a higher content of acidic monomer than the resin particles.

Further information regarding resin emulsions suitable for dispersing or binding pigment colorants is disclosed in, for example, U.S. Pat. No. 5,766,818; copending application U.S. Ser. No. 08/869,962, now U.S. Pat. No. 6,329,446, filed Jun. 5, 1997, entitled "Ink Compositions," with the named inventors Guerino G. Sacripante, Garland J. Nichols, Elizabeth A. Kneisel, and Chieh-Min Cheng; copending application U.S. Ser. No. 08/903,700, now U.S. Pat. No. 6,251,087, filed Jul. 31, 1997, entitled "Inks With Colored Resin Emulsion Particles," with the named inventors Guerino G. Sacripante, Garland J. Nichols, Min-Hong Fu, Chieh-Min Cheng, and Daniel G. Marsh; copending application U.S. Ser. No. 08/828,850, filed Mar. 31, 1997, entitled "Ink Compositions," with the named inventors Garland J. Nichols, Daniel G. Marsh, and Chieh-Min Cheng; copending application U.S. Ser. No. 09/385,207, now U.S. Pat. No. 6,184,268, filed Aug. 30, 1999, entitled "Ink Compositions and Processes," with the named inventors Garland J. Nichols, Chieh-Min Cheng, and Min-Hong Fu; copending application U.S. Ser. No. 09/365,386, now U.S. Pat. No. 6,180,691, filed Aug. 2, 1999, entitled "Ink Processes," with the named inventors Chieh-Min Cheng, Garland J. Nichols, and Min-Hong Fu; copending application U.S. Ser. No. 09/375,031, filed Aug. 16, 1999, entitled "Ink Compositions," with the named inventors Garland J. Nichols, Chieh-Min Cheng, Min-Hong Fu, and Elizabeth A. Kneisel; copending application U.S. Ser. No. 09/385,908, now U.S. Pat. No. 6,239,193, filed Aug. 30, 1999, entitled "Ink Compositions and Processes," with the named inventors Chieh-Min Cheng and Garland J. Nichols; and copending application U.S. Ser. No. 08/960,754, now U.S. Pat. No. 5,944,650 filed Oct. 29, 1997, entitled "Surfactants," with the named inventors Nan-Xing Hu, Paul F. Smith, and Beng S. Ong; the disclosures of each of which are totally incorporated herein by reference.

When present, the optional amino-functional resin emulsion is present in the ink in any desired or effective amount, with the amino-functional resin solids content of the ink typically being from about 0.05 to about 50 percent by weight of the ink, and preferably from about 0.1 to about 20 percent by weight of the ink, although the amount can be outside of this range. The ratio by weight of amino-functional resin solids to pigment particles typically is from about 1:15 to about 15:1, although the ratio can be outside of this range.

Other optional additives to the inks include biocides such as DOWICIL® 150, 200, and 75, benzoate salts, sorbate salts, PROXEL® GXL and BD20, available from Zeneca, PARADYME®, available from Zeneca, and the like, present in an amount of from about 0.0001 to about 4 percent by weight of the ink, and preferably from about 0.01 to about 2.0 percent by weight of the ink, pH controlling agents such as acids or, bases, phosphate salts, carboxylates salts, sulfite salts, amine salts, and the like, present in an amount of from 0 to about 1 percent by weight of the ink and preferably from about 0.01 to about 1 percent by weight of the ink, or the like.

One example of an additive to the inks is a polymeric additive consisting of two polyalkylene oxide chains bound to a central bisphenol-A-type moiety. This additive is of the formula

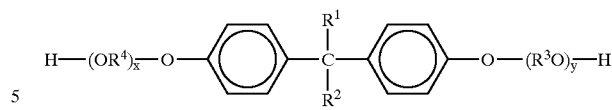

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in Polyethers, N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.*, C25(3), 325–373 (1985), the disclosures of each of which are totally incorporated herein by reference. The polyalkylene oxide additive is generally present in the ink in an amount of at least about 1 part per million by weight of the ink. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

The ink compositions are generally of a viscosity suitable for use in thermal ink jet printing processes. At room temperature (i.e., about 25° C.), typically, the ink viscosity is no more than about 10 centipoise, and preferably is from about 1 to about 5 centipoise, more preferably from about 1 to about 4 centipoise, although the viscosity can be outside this range.

Ink compositions of the present invention can be of any suitable or desired pH. For some embodiments, such as thermal ink jet printing processes, typical pH values are from about 3 to about 11, preferably from about 5 to about 10, and more preferably from about 6 to about 9, although the pH can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

The present invention is also directed to a process which entails incorporating the inks of the present invention into an ink jet printing apparatus and causing droplets of the inks to be ejected in an imagewise pattern onto a recording substrate. In one preferred embodiment, the printing apparatus employs a thermal ink jet process wherein the ink in the nozzles is selectively heated in an imagewise pattern, thereby causing droplets of the ink to be ejected in imagewise pattern. In another preferred embodiment, the printing apparatus employs an acoustic ink jet process, wherein droplets of the ink are caused to be ejected in imagewise pattern by acoustic beams. Any suitable substrate or recording sheet can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

While not being limited to any particular theory, it is believed that the amine functionalized pigment in the second ink is precipitated by the anionic dye from the first ink when the two inks contact each other on the print substrate. By precipitating and immobilizing the colorants in this manner, intercolor bleed is reduced. This precipitation occurs regardless of which ink is printed first.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A black ink composition was prepared by simple mixing of the following ingredients:

| Ingredient | Supplier | Amount (grams) |
| --- | --- | --- |
| deionized water | — | 47 |
| PROXEL GXL biocide | Zeneca Colors | 1 |
| formamide | Aldrich Chemical Co. | 70 |
| DOWANOL ® TPM | Dow Chemical Co. | 20 |
| 1-octyl-2-pyrrolidinone | Aldrich Chemical Co. | 2 |
| modified CABOJET ® 300 pigment* | Cabot Corp. | 60 |
| roll mill 30 minutes | | |

*aqueous solution containing 17.7 wt. % pigment particles in water; pigment particles modified to contain quaternary amine functional groups on the surface thereof.

The ink was filtered through a 1 micron Gelman glass fiber syringe filter. The resulting ink exhibited a viscosity of 2.65 centipoise at 25° C., a pH of 7 at 25° C., a surface tension of 31.3 dynes per centimeter, and a conductivity of 1.5 millimhos.

A yellow ink composition was prepared by simple mixing of the following ingredients:

| Ingredient | Supplier | Amount (parts by weight) |
| --- | --- | --- |
| deionized water | — | 10 |
| DOWICIL ® 150/200 biocide | Dow Chemical Co. | 0.1 |
| polyethylene oxide* | Polysciences | 0.05 |
| imidazole | BASF | 1 |
| ethylene diamine tetraacetic acid | Dow Chemical Co. | 0.065 |
| urea | Arcadian Corp. | 6 |
| sulfolane** | Phillips Petroleum Co. | 15 |
| acetylethanolamine*** | Scher Chemical | 16 |
| butyl carbitol | Van Waters & Rogers | 12 |
| PROJET ® YELLOW OAM dye**** | Zeneca Colors | 40 |
| roll mill 30 minutes | | |

*bisphenol-A derivative, molecular weight 18,500, of the formula

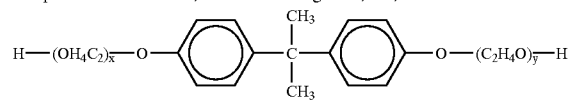

**95 wt. % sulfolane, 5 wt. % water
***75 wt. % acetylethanolamine, 25 wt. % water
****Containing 7.5 wt. % Acid Yellow 23 dye in water A magenta ink composition was prepared by simple mixing of the following ingredients:

| Ingredient | Supplier | Amount (parts by weight) |
| --- | --- | --- |
| deionized water | — | 16 |
| DOWICIL ® 150/200 biocide | Dow Chemical Co. | 0.1 |
| polyethylene oxide* | Polysciences | 0.05 |
| imidazole | BASF | 1 |
| ethylene diamine tetraacetic acid | Dow Chemical Co. | 0.065 |
| sulfolane** | Phillips Petroleum Co. | 15 |
| acetylethanolamine*** | Scher Chemical | 16 |
| butyl carbitol | Van Waters & Rogers | 12 |
| PROJET ® MAGENTA 3B-OA dye**** | Zeneca Colors | 32.9 |
| PROJET ® RED OAM dye***** | Zeneca Colors | 7.17 |
| roll mill 30 minutes | | |

*bisphenol-A derivative, molecular weight 18,500, of the formula

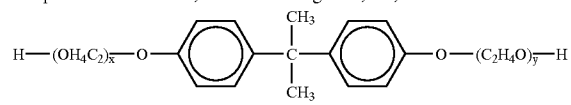

**95 wt. % sulfolane, 5 wt. % water
***75 wt. % acetylethanolamine, 25 wt. % water
****containing 10 wt. % dye solids in water
*****containing 8.5 wt. % dye solids in water A cyan ink composition was prepared by simple mixing of the following ingredients:

| Ingredient | Supplier | Amount (parts by weight) |
| --- | --- | --- |
| deionized water | — | 26 |
| DOWICIL ® 150/200 biocide | Dow Chemical Co. | 0.1 |
| polyethylene oxide* | Polysciences | 0.05 |
| imidazole | BASF | 1 |
| ethylene diamine tetraacetic acid | Dow Chemical Co. | 0.065 |

| Ingredient | Supplier | Amount (parts by weight) |
| --- | --- | --- |
| sulfolane** | Phillips Petroleum Co. | 15 |
| acetylethanolamine*** | Scher Chemical | 16 |
| butyl carbitol | Van Waters & Rogers | 12 |
| Direct Blue 199 dye**** | Zeneca Colors | 15 |
| Acid Blue 9 dye***** | Zeneca Colors | 15 |
| roll mill 30 minutes | | |

*bisphenol-A derivative, molecular weight 18,500, of the formula

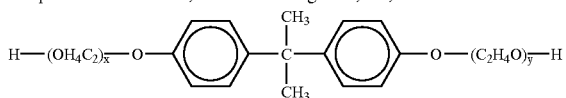

**95 wt. % sulfolane, 5 wt. % water
***75 wt. % acetylethanolamine, 25 wt. % water
****containing 10 wt. % dye solids in water
*****containing 10 wt. % dye solids in water The black, yellow, magenta, and cyan inks were all incorporated into a XEROX® DocuPrint® XJ4C thermal ink jet printer and multicolor test pattern images were generated on XEROX® Courtland paper. Intercolor bleed was measured as a MFLEN value.

Intercolor bleed (ICB) usually is caused by undesirable mixing of inks near the bordering areas and results in a distorted line image with irregular edges and large MFLEN values. The smaller MFLEN number is desirable because it shows sharper line image with reduced intercolor bleed. The average MFLEN (Mid Frequency Line Edge Noise, Horizontal lines) of the images made with the inks was 18. The MFLEN number was obtained by equipment consisting of a personal computer, an illuminating light source, a filter, and an imaging microscope with a CDD sensor. The equipment was calibrated with a standard image (line with sharp edges). Software using a Fourier Transform technique was used to calculate the MFLEN data and line width.

EXAMPLE II

A black ink is prepared as described in Example I.

A yellow ink composition is prepared by simple mixing of the following ingredients:

| Ingredient | Supplier | Amount (parts by weight) |
| --- | --- | --- |
| deionized water | — | 42.85 |
| DOWICIL ® 150/200 biocide | Dow Chemical Co. | 0.10 |
| polyethylene oxide* | Polysciences | 0.05 |
| tris(hydroxymethyl) aminomethane | American Biorganics Inc. | 0.65 |
| ethylene diamine tetraacetic acid | Dow Chemical Co. | 0.35 |
| dipropylene glycol | Ashland Chemicals | 10 |
| DOWANOL ® TPM | Dow Chemical Co. | 11 |
| Acid Yellow 17 dye** | Tricon Colors | 15 |
| PROJET ® YELLOW 1G dye*** | Zeneca Colors | 20 |
| roll mill 30 minutes | | |

*bisphenol-A derivative, molecular weight 18,500, of the formula

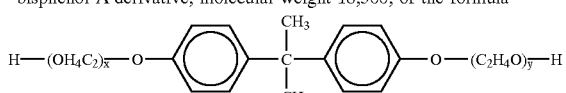

**containing 10 wt. % dye solids in water
***containing 7.5 wt. % dye solids in water A magenta ink composition is prepared by simple mixing of he following ingredients:

| Ingredient | Supplier | Amount (parts by weight) |
| --- | --- | --- |
| deionized water | — | 47.40 |
| DOWICIL ® 150/200 biocide | Dow Chemical Co. | 0.10 |
| polyethylene oxide* | Polysciences | 0.05 |
| tris(hydroxymethyl) aminomethane | American Biorganics Inc. | 0.65 |
| ethylene diamine tetraacetic acid | Dow Chemical Co. | 0.35 |
| dipropylene glycol | Ashland Chemicals | 10 |
| DOWANOL ® TPM | Dow Chemical Co. | 11 |
| PROJET ® MAGENTA 3B-OA dye** | Zeneca Colors | 25 |
| PROJET ® RED OAM dye*** | Zeneca Colors | 5.45 |
| roll mill 30 minutes | | |

*bisphenol-A derivative, molecular weight 18,500, of the formula

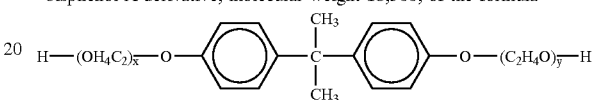

**containing 10 wt. % dye solids in water
***containing 8.5 wt. % dye solids in water A cyan ink composition is prepared by simple mixing of the following ingredients:

| Ingredient | Supplier | Amount (parts by weight) |
| --- | --- | --- |
| deionized water | — | 42.85 |
| DOWICIL ® 150/200 biocide | Dow Chemical Co. | 0.10 |
| polyethylene oxide* | Polysciences | 0.05 |
| tris(hydroxymethyl) aminomethane | American Biorganics Inc. | 0.65 |
| ethylene diamine tetraacetic acid | Dow Chemical Co. | 0.35 |
| dipropylene glycol | Ashland Chemicals | 10 |
| DOWANOL ® TPM | Dow Chemical Co. | 11 |
| DUASYN ® Turquoise Blue FRL-sf dye** | Hoechst | 35 |
| roll mill 30 minutes | | |

*bisphenol-A derivative, molecular weight 18,500, of the formula

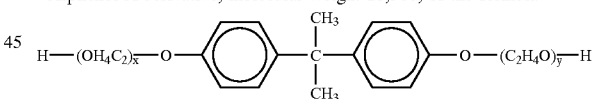

**containing 10 wt. % dye solids in water

The black, yellow, magenta, and cyan inks are all incorporated into a XEROX® DocuPrint® XJ4C thermal ink jet printer and multicolor test pattern images are generated on XEROX® Courtland paper. It is believed that results similar to those observed in Example II will be observed.

COMPARATIVE EXAMPLE A

Black, cyan, magenta, and yellow inks were prepared and used to generate multicolored images as described in Example I with the exception that the pigment used in the black ink was CABOJET® 300 carbon black in the commercially available form (believed to have carboxylic acid functional groups or carboxylic acid functional group containing moieties chemically bonded to the particle surfaces thereof). The average MFLEN (Mid Frequency Line Edge Noise, Horizontal lines) of the images made with the inks was 36.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. A set of inks for printing multicolor images in an ink jet printer, said ink set consisting of (1) a first ink having a first color and comprising water and an anionic dye; (2) one second ink having a second color different from the first color and comprising (a) water, and (b) pigment particles having chemically bonded to the surfaces thereof moieties containing amine or quaternary amine functional groups; and (3) optional additional inks each having a color different from the first color and the second color and comprising water and an anionic dye, wherein the anionic dyes in the first ink and optional additional inks are capable of being immobilized on a printing substrate by interaction with the pigment particles in the second ink, thereby enabling reduced intercolor bleed.

2. A set of inks according to claim 1 wherein the pigment particles in the second ink are carbon black.

3. A set of inks according to claim 1 wherein the pigment particles in the second ink have chemically bonded to the surface thereof moieties containing functional groups of the formulae

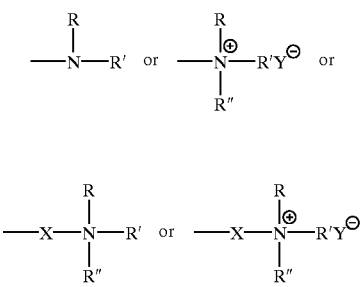

wherein R, R', and R" are each, independently of the others, hydrogen atoms, alkyl groups, aryl groups, arylalkyl, or alkylaryl groups, X is an alkylene group, an arylene group, an arylalkylene group, or an alkylarylene group, and Y is an anion.

4. A set of inks according to claim 1 wherein the pigment particles in the second ink have chemically bonded to the surface thereof moieties containing functional groups selected from the group consisting of pyridine, pyridinium salts, N-ethyl pyridinium salts, N-methyl pyridinium salts, choline salts, those of the formula

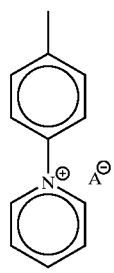

wherein A is an anion, those of the formula

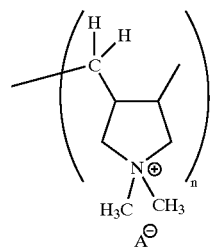

wherein A is an anion and n is an integer representing the number of repeat monomer units, and mixtures thereof.

5. A set of inks according to claim 1 wherein the pigment is present in the second ink in an amount of from about 0.1 to about 8 percent by weight of the second ink.

6. A set of inks according to claim 1 wherein the pigment is present in the second ink in an amount of from about 2 to about 7 percent by weight of the second ink.

7. A set of inks according to claim 1 wherein the first ink contains the anionic dye in an amount of from about 0.05 to about 10 percent by weight of the first ink.

8. A set of inks according to claim 1 wherein the first ink contains the anionic dye in an amount of from about 1 to about 5 percent by weight of the first ink.

9. A set of inks according to claim 1 wherein the first ink further comprises urea, sulfolane, acetylethanolamine, and butyl carbitol and wherein the second ink further comprises formamide, tripropylene glycol monomethyl ether, and 1-octyl-2-pyrrolidinone.

10. A set of inks according to claim 9 wherein the first ink further comprises imidazole, polyethylene oxide, ethylene diamine tetraacetic acid, and a biocide.

11. A set of inks according to claim 1 wherein the first ink further comprises dipropylene glycol and tripropylene glycol monomethyl ether and wherein the second ink further comprises formamide, tripropylene glycol monomethyl ether, and 1-octyl-2-pyrrolidinone.

12. A set of inks according to claim 11 wherein the first ink further comprises tris(hydroxymethyl)aminomethane, polyethylene oxide, ethylene diamine tetraacetic acid, and a biocide.

13. A multicolor ink jet printing process which consists of: (1) incorporating into an ink jet printer an ink set consisting of (a) a first ink having a first color and comprising water and an anionic dye; (b) one second ink having a second color different from the first color and comprising (i) water, and (ii) pigment particles having chemically bonded to the surfaces thereof moieties containing amine or quaternary amine functional groups; and (iii) optional additional inks each having a color different from the first color and the second color and comprising water and an anionic dye; (2) causing droplets of the first ink to be ejected in an imagewise pattern onto a substrate; (3) causing droplets of the second ink to be ejected in an imagewise pattern onto the substrate; and (4) optionally causing droplets of any optional additional inks to be ejected in an imagewise pattern onto the substrate, wherein the anionic dyes in the first ink and optional additional inks are capable of being immobilized on the substrate by interaction with the pigment particles in the second ink, thereby enabling reduced intercolor bleed.

14. A process according to claim 13 wherein the printing apparatus employs a thermal ink jet process wherein the ink in the nozzles is selectively heated in an imagewise pattern, thereby causing droplets of the ink to be ejected in imagewise pattern.

15. A process according to claim 13 wherein the printing apparatus employs an acoustic ink jet process, wherein droplets of the ink are caused to be ejected in imagewise pattern by acoustic beams.

16. A process according to claim 13 wherein the substrate is paper.

17. A process according to claim 13 wherein the pigment particles in the second ink are carbon black.

18. A process according to claim 13 wherein the pigment particles in the second ink have chemically bonded to the surface thereof moieties containing functional groups of the formulae

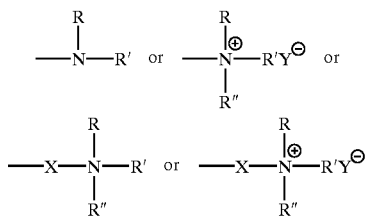

wherein R, R', and R" are each, independently of the others, hydrogen atoms, alkyl groups, aryl groups, arylalkyl, or alkylaryl groups, X is an alkylene group, an arylene group, an arylalkylene group, or an alkylarylene group, and Y is an anion.

19. A process according to claim 13 wherein the pigment particles in the second ink have chemically bonded to the surface thereof moieties containing functional groups selected from the group consisting of pyridine, pyridinium salts, N-ethyl pyridinium salts, N-methyl pyridinium salts, choline salts, those of the formula

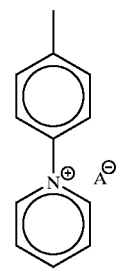

wherein A is an anion, those of the formula

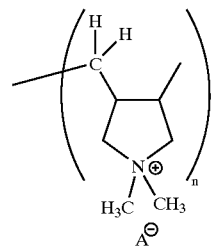

wherein A is an anion and n is an integer representing the number of repeat monomer units, and mixtures thereof.

20. A process according to claim 13 wherein the pigment is present in the second ink in an amount of from about 0.1 to about 8 percent by weight of the second ink.

\* \* \* \* \*